E. JEANMAIRE.
VENTILATING MILK CAN LID.
APPLICATION FILED MAY 20, 1922.

1,438,376.

Patented Dec. 12, 1922.

INVENTOR.
Edward Jeanmaire
BY
ATTORNEY

Patented Dec. 12, 1922.

1,438,376

UNITED STATES PATENT OFFICE.

EDWARD JEANMAIRE, OF GAZELLE, CALIFORNIA.

VENTILATING MILK-CAN LID.

Application filed May 20, 1922. Serial No. 562,472.

*To all whom it may concern:*

Be it known that I, EDWARD JEANMAIRE, a citizen of Switzerland, residing at Gazelle, Siskiyou County, State of California, have invented certain new and useful Improvements in Ventilating Milk-Can Lids; and I do declare the following to be a full, clear, and exact description of the same, reference being had to the accompanying drawings, and to the characters of reference marked thereon, which form a part of this application.

This invention relates to improvements in standard milk-can lids or covers, the principal object of my invention being to provide a cover structure, to be used instead of the usual cover, which may be opened to permit air to enter the can, but any foreign matter, insects or moisture in the air is prevented from entering.

My improved lid is therefore admirably suited for use when leaving the cans full of milk to stand over night in order to allow the cream to rise, under which conditions the milk is kept in a fresher condition if the cool night air is allowed access thereto, but which cannot very well be done with the ordinary can-covers, since to remove them is to invite flies and other insects to swarm to the milk, and permits dust and dirt to settle on the surface of the milk.

My device is formed as a member readily removable from the can, and one which may be easily and thoroughly washed and scrubbed when occasion demands.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
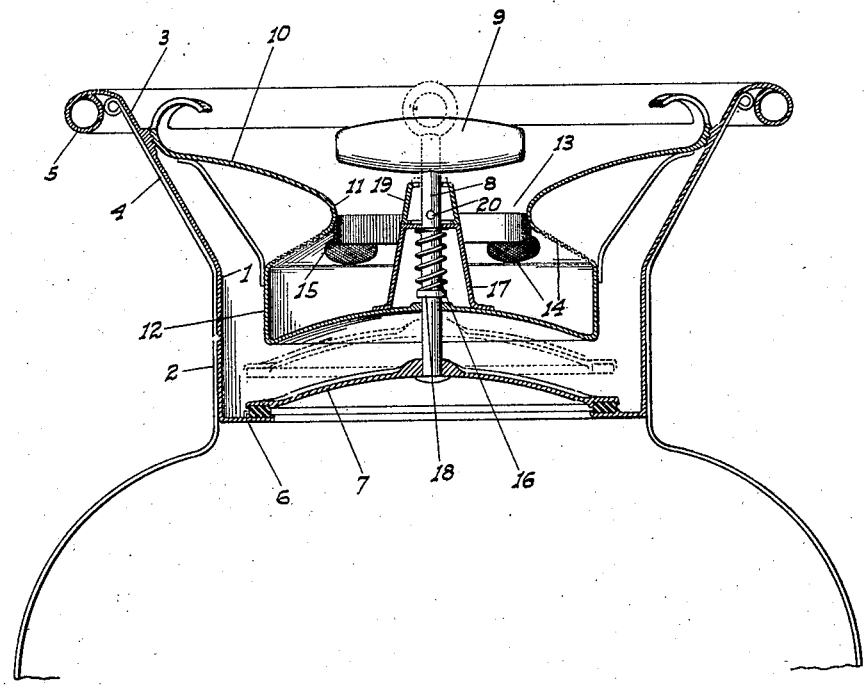
Fig. 1 is a sectional view of the device, showing the lid closed.
Figure 2:
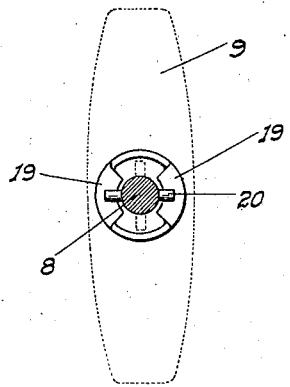
Fig. 2 is a fragmentary cross section showing the handle-stem and the holding or catch members to co-operate therewith.

Referring now more particularly to the characters of reference on the drawings, the numeral 1 denotes a cylindrical casing adapted to fit into the neck 2 of the milk can, and having an outwardly flaring portion 3 on its upper end to seat in the mouth 4 of the can-neck.

This portion 3 may have handles 5 if necessary whereby to remove the entire structure from the can.

On the lower end of the member 1 is an inturned flange 6 forming on its upper surface a seat for a cover 7 provided with a centrally disposed stem 8 having a handle 9 on its upper end.

Removably seated in the member 3 is a downwardly and inwardly sloping member 10, which at its inner end curves down and outwardly as at 11, to then form at its outer termination, a junction with a vertical moisture-receptacle 12, spaced from the casing 1 and cover 7. The members 10—11 thus form an overhanging and hollow projection above the receptacle, outlining a central orifice 13 through which the handle-stem 8 projects.

The surface 11, on its under side, is provided with a plurality of screened orifices 14, so that air may freely pass therethrough, down between the walls 1 and 12, and into the interior of the can, if the lid or cover 7 is open. At the same time flies etc. cannot enter the can, and dust will not settle, and neither can moisture drop into the can, since the orifices are on the underside of the hollow projection.

In order to positively cause any moisture running down the slope 10 to fall directly into the receptacle or catch bowl 12, rather than following along the wall 11 and thence through the orifices, a ring 15 is fitted into the orifice 13 and connected around its upper edge to the surrounding wall, the lower end of said ring however being free of the wall, thereby causing any moisture present to pass down the ring and be diverted from the wall 11.

To cause the cover 7 to normally remain tightly seated, I provide a tension spring 16 about the stem above the bottom of the bowl 12, this spring being enclosed in a casing 17 having a watertight fit with the bottom of the bowl, and through which the stem 8 passes. This spring bears against the casing 17 at its upper end, and at its lower end against a pin or collar 18 fixed on the stem inside said casing.

On then raising the handle, the cover will be raised from its seat against the pressure of the spring, and will at once resume its seat when the handle is released.

In order therefore to allow the cover to be held open with retaining a constant hold on the handle, I provide opposed catch-ears 19, projecting upwardly from and fixed to the member 17, adapted to form a support for a cross pin 20 on the stem 8 when the latter is raised to pass the pin above the ears, and then rotated enough to cause said pin to lay across the ears.

To clean and drain out the device, the bowl with the cover and operating mechanism may be removed alone, or the casing 1—3 may be withdrawn as well, any moisture in the bowl being poured out by inverting the latter.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A milk-can lid structure including a casing adapted to be fitted into the mouth of a milk can, a cover openable at will seating against the casing, and a moisture catch-bowl above the cover and connected with the mouth of the casing to receive any moisture collecting thereon.

2. A milk-can lid structure including a casing adapted to be fitted into the mouth of a milk can, a cover openable at will seating against the casing, a moisture catch-bowl above the cover and connected with the casing to receive any moisture collecting thereon, and means for allowing air to enter the can between the casing and bowl when the cover is open without the possibility of moisture entering therein.

3. A milk-can lid structure including a casing adapted to be fitted into the mouth of a milk can, a cover openable at will seating against the casing, a moisture catch-bowl above the cover and connected with the casing to receive any moisture collecting thereon, the upper end of the bowl having an inwardly overhanging and hollow wall structure below the connection of the bowl with the casing, and screened ventilating orifices cut through the underside of said overhanging structure, the bowl being spaced from the casing below the orifices.

4. A milk-can lid structure including a casing adapted to be fitted into the mouth of a milk can, a cover openable at will seating against the casing, a moisture catch-bowl above the cover and connected with the casing to receive any moisture collecting thereon, the upper end of the bowl having an inwardly overhanging and hollow wall structure below the connection of the board with the casing and outlining a central orifice, the upper wall of said structure sloping upwardly to the casing, screened ventilating orifices in the underside of said overhanging structure, and a moisture deflecting ring in said central orifice fixed all around to the surrounding wall at its upper end but depending free thereof at its lower end.

5. A milk-can lid structure including a moisture-catch bowl seated in the mouth of the can, an openable cover member making a closure for the can positioned under the bowl, ventilating means between the bowl and can for admitting air to the latter when the cover is opened and means whereby no moisture can pass into the can with the air.

6. A milk-can lid structure including a moisture-catch bowl seated in the mouth of the can, an openable cover member making a closure for the can positioned under the bowl, a stem secured to the cover and projecting through the bottom of the bowl, spring means in the latter acting on the stem to hold the cover closed, ears fixed in opposed relation with respect to the stem, and a cross pin on the latter adapted to engage and be supported by the ears when the stem is moved to open the cover and then rotated to move the pin into the plane of the ears.

In testimony whereof I affix my signature.

EDWARD JEANMAIRE.